United States Patent
Lang et al.

(10) Patent No.: US 10,015,653 B2
(45) Date of Patent: Jul. 3, 2018

(54) HOSPITALITY SYSTEMS

(71) Applicant: Carrier Corporation, Farmington, CT (US)

(72) Inventors: Michael Lang, Salem, OR (US); Adam Purdue, Salem, OR (US); Steve Switzer, Duluth, GA (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 15/317,634

(22) PCT Filed: May 7, 2015

(86) PCT No.: PCT/US2015/029593
§ 371 (c)(1),
(2) Date: Dec. 9, 2016

(87) PCT Pub. No.: WO2015/191190
PCT Pub. Date: Dec. 17, 2015

(65) Prior Publication Data
US 2017/0127222 A1    May 4, 2017

Related U.S. Application Data

(60) Provisional application No. 62/010,540, filed on Jun. 11, 2014.

(51) Int. Cl.
*H04B 7/00* (2006.01)
*H04W 4/00* (2018.01)
(Continued)

(52) U.S. Cl.
CPC .......... *H04W 4/80* (2018.02); *G07C 9/00103* (2013.01); *G07C 9/00309* (2013.01);
(Continued)

(58) Field of Classification Search
CPC .......... H04L 29/06; H04W 4/00; H04W 4/12; H04W 4/021; H04W 4/022; H04W 4/029;
(Continued)

(56) References Cited

U.S. PATENT DOCUMENTS 6,950,645 B1     9/2005  Kammer et al.
6,975,202 B1 *  12/2005  Rodriguez ......... G07C 9/00103
                                                    340/10.1

(Continued)

FOREIGN PATENT DOCUMENTS

EP      2706726 A2     3/2014

OTHER PUBLICATIONS

J. Decuir, "Introducing Bluetooth Smart: Part II: Applications and updates", IEEE Consumer Electronics Magazine, IEEE, Piscataway, NJ USA, vol. 3, No. 2, Apr. 1, 2014, pp. 25-29.

(Continued)

*Primary Examiner* — Blane Jackson
(74) *Attorney, Agent, or Firm* — Locke Lord LLP; Scott D. Wofsy; Joshua L. Jones

(57) ABSTRACT

A locking device for providing access to a structure includes a locking mechanism configured to selectively switch between a locked state and an unlocked state. A wireless interface is operatively connected to the locking mechanism to control change between the locked and unlocked states. The wireless interface is configured to periodically beacon a data packet providing information to listening devices in a local area without requiring a bi-directional connection and to support bi-directional connections as needed to transfer data to the locking device.

17 Claims, 5 Drawing Sheets

(51) Int. Cl.
*H04W 4/30* (2018.01)
*H04W 4/80* (2018.01)
*H04W 48/10* (2009.01)
*H04W 52/30* (2009.01)
*G07C 9/00* (2006.01)
*G06Q 10/02* (2012.01)

(52) U.S. Cl.
CPC ............ *H04W 4/008* (2013.01); *H04W 48/10* (2013.01); *H04W 52/30* (2013.01); *G06Q 10/02* (2013.01); *G07C 2009/00317* (2013.01); *G07C 2009/00412* (2013.01); *G07C 2009/00642* (2013.01)

(58) Field of Classification Search
CPC .......... H04W 4/30; H04W 4/33; H04B 15/00; H04B 7/00; H04B 17/00
See application file for complete search history.

(56) References Cited

U.S. PATENT DOCUMENTS

| | | | |
|---|---|---|---|
| 7,230,933 B2 | 6/2007 | Bahl et al. | |
| 7,315,823 B2 * | 1/2008 | Brondrup | G06Q 10/02 |
| | | | 705/5 |
| 7,653,017 B2 | 1/2010 | Huylebroeck | |
| 7,680,520 B2 | 3/2010 | Ruuska et al. | |
| 7,873,989 B2 | 1/2011 | Karkas et al. | |
| 8,073,388 B2 | 12/2011 | Grushkevich et al. | |
| 8,213,864 B1 | 7/2012 | Zhodzishsky et al. | |
| 8,250,612 B2 | 8/2012 | Kim et al. | |
| 9,462,623 B2 | 10/2016 | Jakusovszky et al. | |
| 9,672,345 B2 * | 6/2017 | Davis | G06F 21/35 |
| 9,691,201 B2 * | 6/2017 | Myers | G07C 9/00103 |
| 9,706,365 B2 * | 7/2017 | Johnson | H04W 4/043 |
| 2012/0108168 A1 | 5/2012 | Metivier | |
| 2013/0284806 A1 | 10/2013 | Margalit | |
| 2013/0318217 A1 | 11/2013 | Imes et al. | |
| 2014/0002236 A1 | 1/2014 | Pineau et al. | |
| 2014/0062659 A1 | 3/2014 | Roosli et al. | |
| 2014/0365773 A1 * | 12/2014 | Gerhardt | G07C 9/00309 |
| | | | 713/168 |
| 2015/0140982 A1 * | 5/2015 | Postrel | H04W 4/008 |
| | | | 455/418 |
| 2015/0327016 A1 * | 11/2015 | Shill | H04W 4/028 |
| | | | 455/456.1 |
| 2016/0359366 A1 * | 12/2016 | Holmstroem | G07C 9/00309 |

OTHER PUBLICATIONS

J. Decuir, "Introducing Bluetooth Smart: Part I: A look at both classic and new technologies", IEEE Consumer Electronics Magazine, IEEE, Piscataway, NJ, USA, vol. 3, No. 1, Jan. 1, 2014, pp. 12-18.

\* cited by examiner

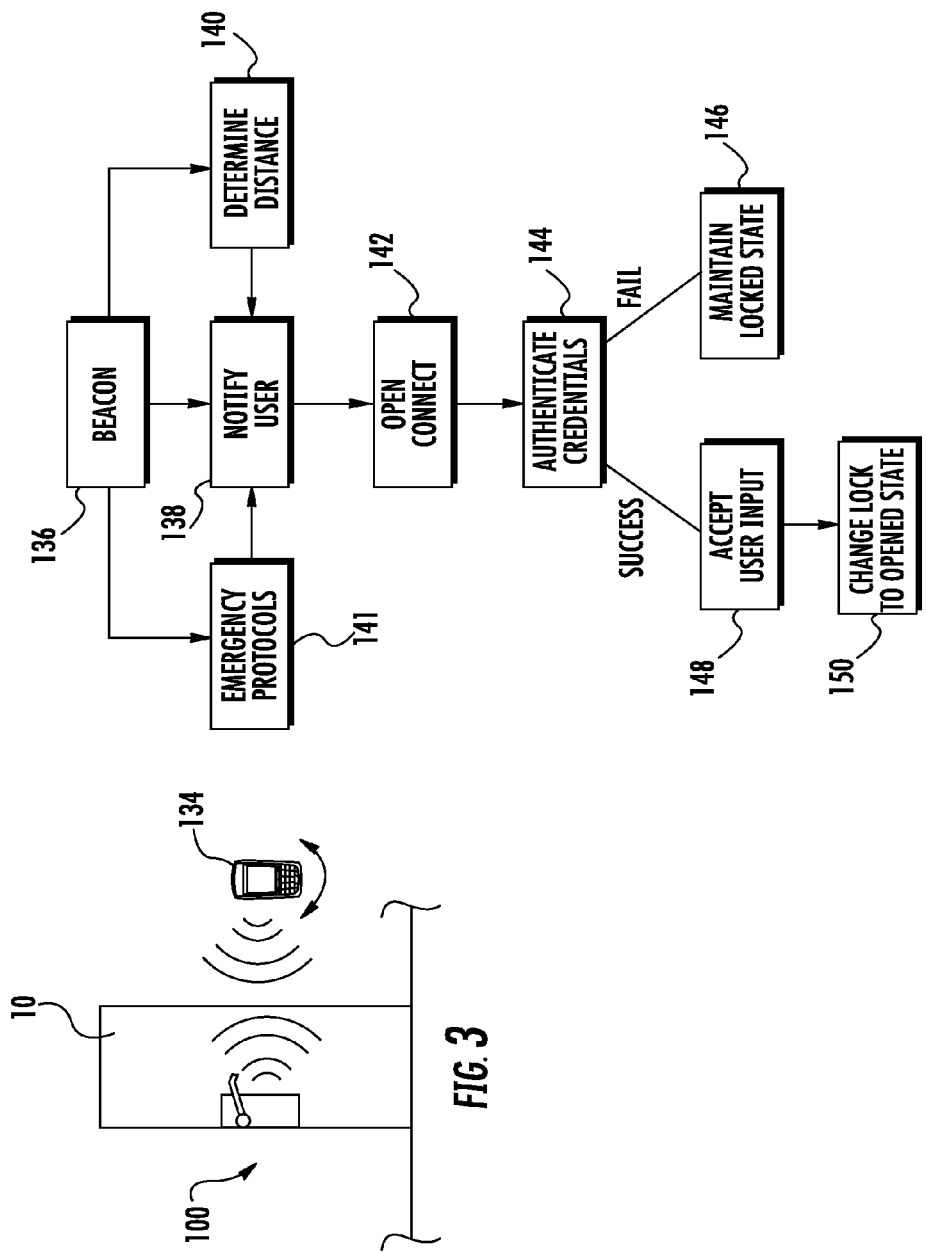

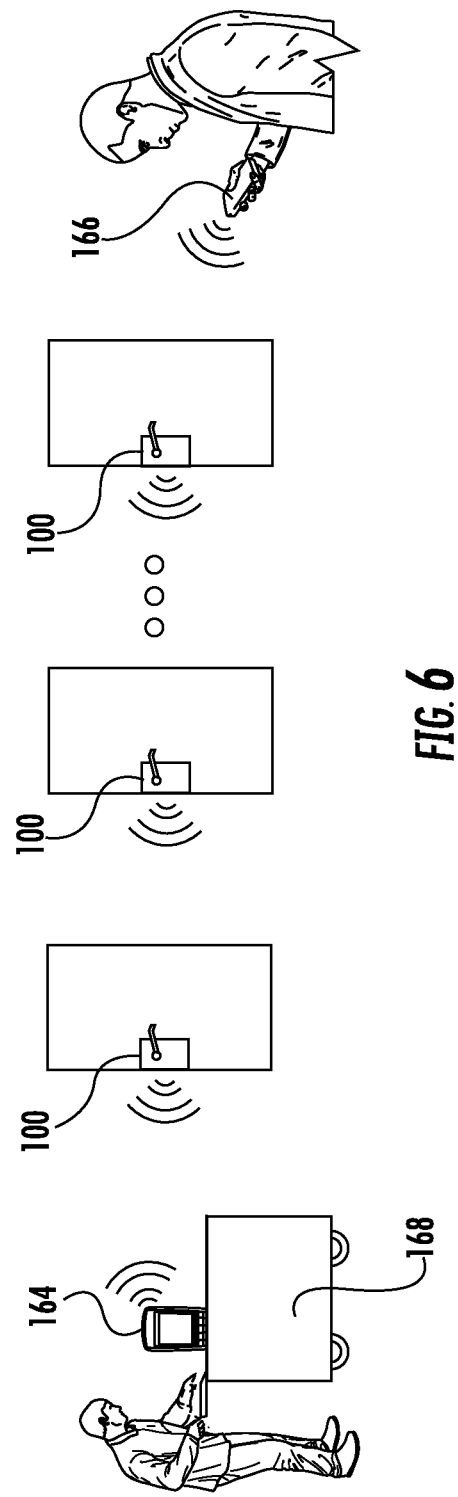

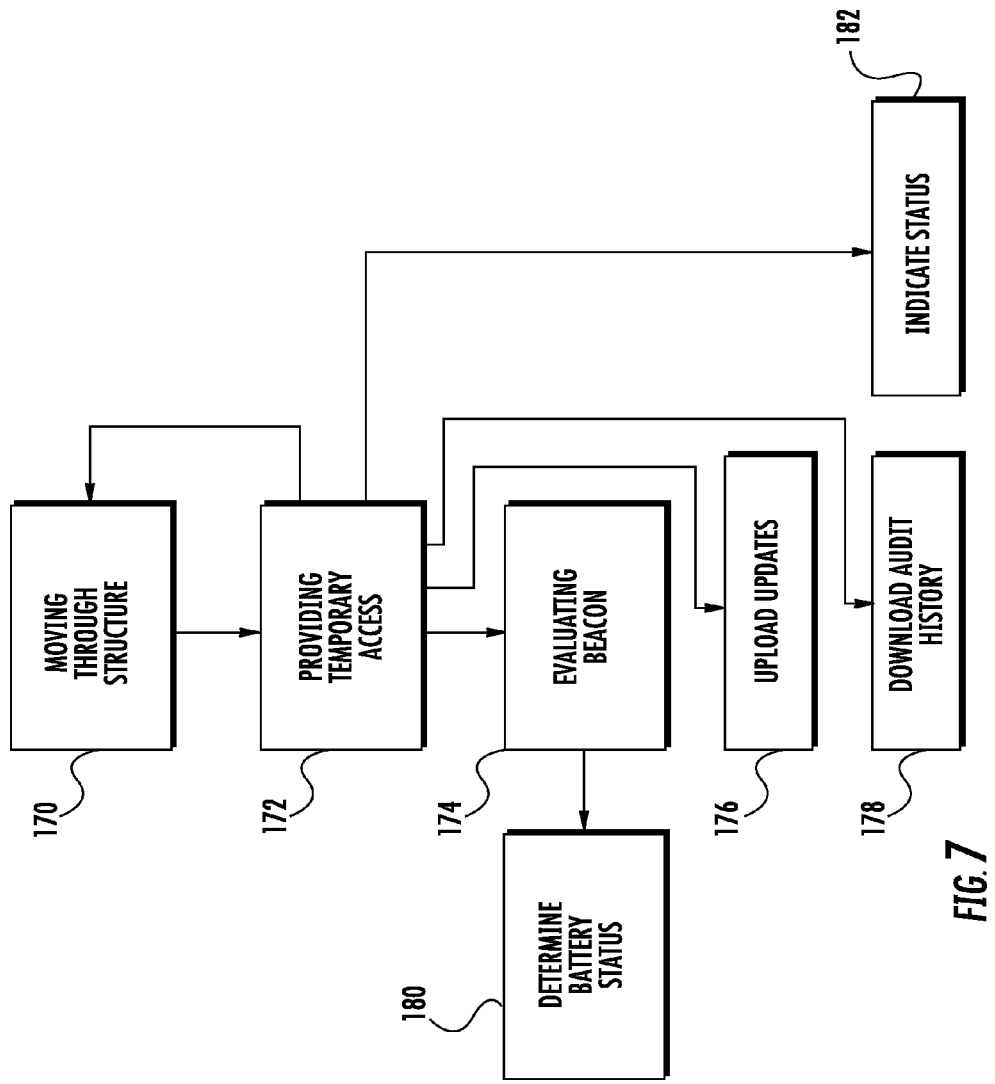

HOSPITALITY SYSTEMS

CROSS-REFERENCE TO RELATED APPLICATIONS

This application is a 35 U.S.C. § 371 National Phase Application of International PCT Patent Application No. PCT/US2015/029593, filed May 7, 2015, which this application claims the benefit of priority U.S. Provisional Patent Application No. 62/010,540 filed Jun. 11, 2014. The entire contents of each of which are incorporated herein by reference.

BACKGROUND OF THE INVENTION

1. Field of the Invention

The present disclosure relates to wireless systems, and more particularly to wireless locking devices, for example for controlling access to hotel rooms.

2. Description of Related Art

Multi-room or multi-suite facilities such as hotels, apartment buildings, office complexes, dormitories, office buildings, classrooms, cruise ships and laboratory facilities, and similar structures have many devices that, if monitored and/or controlled can provide functionalities in facility security, facility operational efficiency, and facility maintenance for the facility operator. These functionalities can generate an overall cost reduction in facility management and maintenance.

For example, hotels have adopted a variety of different check-in procedures to minimize the time required for a guest to check-in. These procedures include adopting electronic key cards as opposed to mechanical keys, which enhances guest security and allows the hotel to change to a new room key, alleviating the need for the guest to return the keys to the front desk at check-out. However, even these procedures still present a distracting delay to a hotel's valuable customers. To increase loyalty amongst frequent travelers, among others, hotel chains have developed rewards programs. The goal of these programs is typically to allow hotel chains to better understand the needs of travelers and make their stay as streamlined as possible. For instance, some hotels provide express check-in for a select set of their guests, while others provide check-in/check-out over the Internet or via a computer kiosk located in the hotel lobby. While these advances have certainly increased the occupancy rates of the various major hotel chains, they have not yet solved the problem of fully automating the guest check-in/check-out process, thereby allowing a guest to arrive at their hotel and enter their room without any additional time-consuming steps.

In addition to check-in/check-out, in a hotel room for example, individual rooms can utilize devices/elements such as doors, electronic locks, Do Not Disturb (DND) devices, lights, heating, ventilation, and air conditioning (HVAC), safe, minibar, draperies, maid communication devices, room occupancy detection and communication, and the like. All of these devices have a potentially high impact on the hotel operation and guest comfort. Should these devices/elements and/or the functionality associated with them connect online and communicate in relative real-time to the appropriate facility management department or monitoring system, many hours of labor can be saved, immediate response to possible threats or safety concerns can be executed, and service levels may be significantly enhanced. Prior systems have attempted to address solutions to some of the above concerns; however, these prior implementations tend to be limited in performance and expensive.

Another challenge is the fact that some devices, such as door locks, are mounted in a way that is not accessible by direct physical wiring. Such devices that cannot be directly accessed by wire typically require battery operation or a similar type of resident power source. Battery operation is expensive over time, particularly for a large facility. As a result, an efficient way to communicate with those devices is desirable.

Solutions for communicating with devices such as those that cannot be accessed by wires have predominately been addressed through combinations of wired connections, Infrared (IR) communication, or specific, highly localized, RF communication methods that are limited on an individual room-by-room basis. One such example is a network that provides communication capabilities with each individual room via dedicated wires, Cable TV, spare telephone wires or a LAN that is physically wired to each individual room. An in-room hub handles the communication to and from the devices in the room via wires where possible, or via IR. As an example, U.S. Pat. No. 7,061,393, the entire contents of which are incorporated herein by reference, describes a system and method for managing a multi-unit building with the combination of IR and wired sensors in a room. Each room is then connected to a floor LAN, which is ultimately connected to management servers and systems.

The challenges facing implementation of a system that addresses the foregoing problems and shortcomings are that most facilities already exist and are operational. This ultimately means that a wired communication network is already in place and the implementation of another communication network would require the installation of a new wired network. The process of pulling wire is difficult, very expensive and usually requires the rotation of a number of rooms off line making them unusable for an extended period of time, which for retrofit impacts facility revenue.

One problem with implementing IR as a part of a wireless communication protocol is that the IR waves cannot penetrate walls or be used to communicate between rooms. In fact, it can be difficult to communicate in the same room around corners. In most instances, IR requires a direct unimpeded line of site between devices that are communicating. If these shortcomings are acceptable, dedicated, closed IR solutions can be implemented with a proprietary protocol, but such solutions are not very energy efficient due to the fact that all devices must be run continuously rather than intermittently. These solutions require an in-room hub and Gateway (GW) to communicate to a central server. In addition, installation of known existing systems requires persons of high skill and technical knowledge, resulting in high installation and on-going maintenance costs.

Such conventional methods and systems have generally been considered satisfactory for their intended purpose. However, there is still a need in the art for improved hospitality systems and the like. The present disclosure provides a solution for this need.

SUMMARY OF THE INVENTION

A locking device for providing access to a structure includes a locking mechanism configured to selectively switch between a locked state and an unlocked state. A wireless interface is operatively connected to the locking mechanism to control change between the locked and unlocked states. The wireless interface is configured to periodically beacon a data packet providing information to listening devices in a local area without requiring a bi-directional connection and to support bi-directional connections as needed to transfer data to the locking device.

The wireless interface can include a Bluetooth® Smart radio configured to beacon the data packet to Bluetooth® Smart and Bluetooth® Smart Ready devices. A battery can be operatively connected to power the locking mechanism and wireless interface, wherein the wireless interface is configured to vary beacon rate depending on reservation status, time of day, day of the week, room occupancy, and the like, to conserve power in the battery. The beacon transmit power can also be adjusted to conserve power in the battery and/or reduce the range of the beacon. The locking mechanism can be configured to lock and unlock a hotel room door.

The data packet can include an indication of lock status including whether the lock has been accessed or tampered. The data packet can include a universally unique identifier (UUID) identifying a lock vendor, a hotel vendor, and/or a locking solutions vendor. It is also contemplated that the data packet can include a unique door identifier, a battery status indicator, an indicator of open or closed door status, a privacy indicator for indicating dead bolt locked or unlocked status, a room occupancy status indicator, an indicator of most recent maintenance or maid service status, and/or any other suitable indicators. The data packet can contain encrypted data, non-encrypted data, or a combination of both.

In another aspect of this disclosure, a method of providing access for a user to a structure includes beaconing a data packet providing information to listening devices in a local area without requiring a bi-directional connection to identify a locking device to a wireless device, e.g., for authentication to provide access. For example, the wireless device can be a smart phone.

Beaconing the data packet can include using a Bluetooth® Smart radio to beacon the data packet, wherein the wireless device is a Bluetooth® Smart or Bluetooth® Smart Ready device. The data packet can include a universally unique identifier (UUID) identifying a lock manufacturer associating the lock with a vendor's application, user credentials, and a target door identifier. The data packet can include a universally unique identifier (UUID) identifying a hotel vendor associating the lock with a vendor's application, user credentials, and a target door identifier. It is also contemplated that the data packet can include a universally unique identifier (UUID) identifying a locking solutions vendor associating the lock with a vendor's application, user credentials, and a target door identifier.

Beaconing a data packet to identify the locking device to the wireless device includes identifying the locking device by including a MAC address for the locking device in the data packet, and can also include identifying the locking device by including a unique door identifier for the locking device in the data packet. The method can include notifying a user of the mobile device as the user approaches a door associated with the locking device identified in the data packet. For example, this can include notifying a user of a mobile device if they are moving towards or away from a door associated with the locking device. For example, the mobile device can display a varying background color and/or a warmer/cooler indication on the wireless device indicating that the user is moving towards or away from a door associated with the locking device. It is also contemplated that the mobile device can provide vibration and/or audible feedback from a mobile device when in proximity to the door associated with the locking device. It is further contemplated that the method can include opening a connection between a wireless device and the locking device; opening a connection between the wireless device and a facility management system; and performing data exchanges between the facility management system and locking device by way of the wireless device.

In another aspect, the method can include opening a connection between the wireless device and the locking device, and exchanging credentials authenticating a user of the wireless device to the locking device. Authentication of user credentials can allow the locking device to activate additional means of authentication. It is contemplated that other forms of blank or pre-encoded media can be made available in the structure such as magnetic stripe cards, RFID cards and the like. These other forms of media will not authenticate to the lock until the credential from the wireless device is authenticated and then the other forms of credentials are immediately presented to the lock activating them for further use.

In certain embodiments, the method includes changing the locking device from a locked state to an unlocked state upon successful authentication of the user. It is contemplated that the method can include accepting user input indicating intent to unlock the locking device, wherein the input includes a rotating motion of the wireless device, a voice command to the wireless device, and/or any other suitable type of input. The method can also include determining distance to the locking device from the wireless device using wireless signal strength, and indicating the distance to a user of the wireless device. The method can further include limiting the distance at which a user can indicate the intent to unlock the locking device using the wireless signal strength.

The method can include using beacon signal strength and door identifiers received by the wireless device to identify relative location of a user within the structure, displaying a map showing the relative location of the user within the structure on the wireless device, and indicating on the map the relative location of at least one of emergency exits, stair wells, vending machines, and elevators. It is contemplated that in the event of an emergency, the method can include highlighting emergency exits on a map and/or activating a flashlight feature of the wireless device upon receiving a beacon which includes an emergency indication.

A system for dispensing duplicate credentials in the form of magnetic stripe or RFID cards can be made available in the structure. The system can include a Kiosk containing a Bluetooth Smart® radio at which the user could connect their wireless device. The Kiosk can dispense cards encoded with the user's credential provided from the wireless device. Reuse of the user's wireless device credential would eliminate the need for a connection between the Kiosk and the Facility Management System. The magnetic stripe or RFID cards can then be used in addition to with wireless device for access to the locking devices.

A system for controlling devices within a structure includes a structure including devices, and a short range wireless interface operatively connected to the devices for control thereof. For example, the structure can include a hotel room and the wireless interface can include a Bluetooth® Smart radio. The devices can include a plurality of door locking devices, wherein the Bluetooth® Smart radio is configured to listen for beacons from respective door locking devices.

In another aspect, there can be a plurality of hotel rooms, each including one of the locking devices, wherein each hotel room includes an HVAC device configured to be controlled by data received from the respective locking device beacon. It is also contemplated that each hotel room can include a room lighting device configured to be controlled by data received from the respective locking device beacon.

In another aspect of this disclosure, a method of connecting devices within a structure includes moving a wireless device through a structure, wherein the wireless device listens for beacons from a plurality of locking devices. The method also includes providing a temporary access point through the wireless device to connect between individual locking devices and a facility management system.

For example, each of the locking devices can include a Bluetooth® Smart radio, and the wireless device can be a computer tablet, a smart phone, or any other suitable device. The method can include evaluating the beacons with the wireless device to determine locking device identifications, and/or to determine status changes in the locking devices. The method can include connecting the wireless device to the locking devices to upload configuration updates to the locking devices, and/or to download audit histories from the locking devices and/or download firmware updates to the locking devices. It is also contemplated that the method can include monitoring the beacons with the wireless device to determine battery status of the locking devices.

Moving the wireless device through the structure can include transporting the wireless device on a hotel service cart, and/or having hotel staff carry the wireless device through the structure. The method can include locally indicating occupancy status from the wireless device, and/or locally indicating maid service access to the structure from the wireless device. Using triangulation from known beacon points within the structure, or any other suitable technique, the facilities management system can determine the location of the service cart or person carrying the mobile device. It is also contemplated that the method can include displaying the location of the wireless device which as the wireless device is carried on a service cart, by guests, and/or by personnel.

A system in accordance with this disclosure for connecting devices within a structure includes an interface device located stationary with respect to a structure. The interface device includes a wireless interface for listening to beacons from locking devices. The interface device includes a communication link for communications between the locking devices and a facility management system.

For example, the wireless interface can include a Bluetooth® Smart radio, and the communication link can include a Wi-Fi device, and/or an Ethernet device. The wireless interface can be configurable to filter for a specific subset of locking device beacon identifications. It is also contemplated that the wireless interface can be configured to evaluate the beacons to determine locking device identifications, and/or to determine a change in status of the locking devices. The wireless interface can be configured to connect and upload configuration updates to the locking devices, to connect and download audit histories from the locking devices, to connect and upload firmware updates to the locking devices, and/or to monitor the beacons to determine battery status in the locking devices.

In another aspect, a system for connecting devices within a structure includes a facility management system operatively connected to group locking devices to access points and access areas. The facility management system can be configured to manage local assignment of credentials to locking devices. At least one roving access point and/or at least one fixed access point can be operatively connected between the facility management system and the locking devices.

This disclosure also describes a system for connecting devices within a structure including a server operatively connected to manage vendors, doors, and user credentials. For example, the server can be part of a facility management system as described above.

A mesh network in accordance with this disclosure includes a plurality of locking devices, each including a Bluetooth® Smart radio. The locking devices are configured to be networked together by the Bluetooth® Smart radios reducing the number of wireless access points required within the structure. The locking devices can be configured to beacon data packets to listening devices, and to periodically form a mesh network allowing communication of updates and audits with a facility management system, to conserve battery power. The locking devices can be configured to connect smart phones to the mesh network using Bluetooth® Smart connections.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 3 is a schematic view of the locking device of FIG. 1, showing the locking device communicating with a wireless mobile device;

FIG. 4 is a schematic view of an exemplary method of providing access to a structure, showing steps for authenticating a user;

FIG. 6 is a schematic view of a portion of the system of FIG. 5, showing two roving access points; and FIG. 7 is a schematic view of an exemplary method of connecting devices in accordance with the present disclosure, showing communications between a roving access point and the locking devices of FIG. 6.

DETAILED DESCRIPTION OF THE PREFERRED EMBODIMENTS

Figure 1:
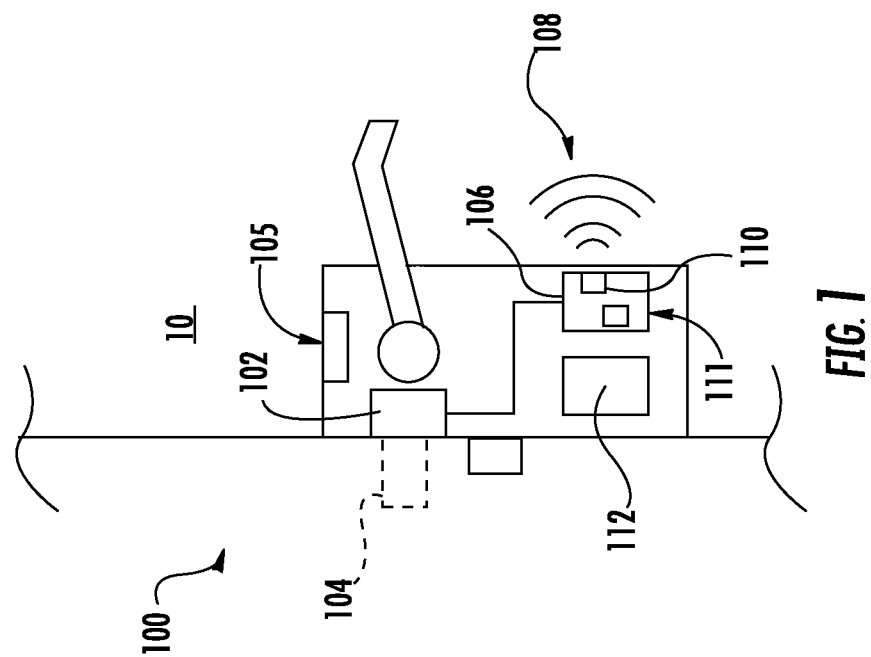
FIG. 1 is a schematic view of an exemplary embodiment of a locking device constructed in accordance with the present disclosure, showing the locking mechanism and wireless interface.

Reference will now be made to the drawings wherein like reference numerals identify similar structural features or aspects of the subject disclosure. For purposes of explanation and illustration, and not limitation, a partial view of an exemplary embodiment of a locking device in accordance with the disclosure is shown in FIG. 1 and is designated generally by reference character 100. Other embodiments of locking devices in accordance with the disclosure, or aspects thereof, are provided in FIGS. 2-7, as will be described. The systems and methods described herein can be used to improve power consumption, connectivity, and functionality in hospitality systems and the like.

Locking device 100 provides access to a structure. As depicted in FIG. 1, locking device 100 is shown in an exemplary context in which locking device 100 is mounted to a door 10 of a hotel room for granting access to individuals with the proper credentials, and for denying access to others, i.e. to lock and unlock the hotel room door 10. Locking device 100 includes a locking mechanism 102 configured to selectively switch between a locked state and an unlocked state. In this example, locking mechanism 102 includes an electrically actuated dead bolt 104 for selectively locking door 10. A wireless interface 106 is operatively connected to locking mechanism 102 to control change between the locked and unlocked states. A magnetic stripe and/or RFID card reader 105 can also be operatively connected to the locking mechanism 102 to control the change between the locked and unlocked states. Wireless interface 106 is configured to periodically beacon a data packet 108 providing information to listening devices in a local area without requiring a bi-directional connection and to support bi-directional connections as needed to transfer data to locking device 100.

Wireless interface 106 includes a Bluetooth® Smart radio 110 configured to beacon the data packet 108 to Bluetooth® Smart and Bluetooth® Smart Ready devices. A battery 112 is operatively connected to power the locking mechanism 102 and wireless interface 106. Wireless interface 106 is configured to vary the beacon rate for beaconing data packet 108 depending on reservation status, time of day, day of the week, or any other suitable controlling factors as needed to conserve power in battery 112. Wireless interface 106 is also configured to vary the transmission power/amplitude of the beaconing data packet 108 depending upon the type of target device, e.g., wireless device 134 or wireless interface 186 (described below), and/or desired range to conserve battery power. A controller 111, e.g., including a processor, memory, and storage for software/firmware with non-transitory instructions for implementing method steps further described below, is connected to battery 112, radio 110, and locking mechanism 102 for control of locking device 100.

Figure 2:
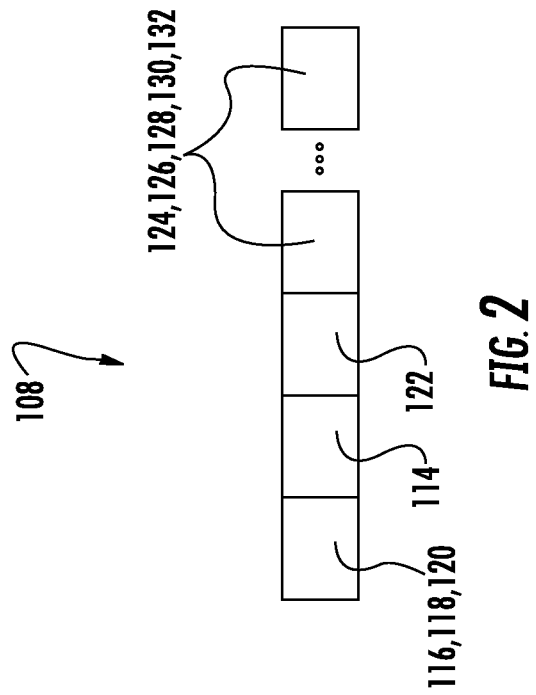
FIG. 2 is a schematic view of an exemplary data packet beaconed from the locking device of FIG. 1, showing various portions of the data packet.

With reference now to the schematic in FIG. 2, data packet 108 can include an indication of lock status 114 including whether the lock has been accessed or tampered. Data packet 108 can optionally include a universally unique identifier (UUID) identifying a lock vendor 116, e.g., associating the lock with a vendor's application, user credentials, and a target door identifier. The data packet 108 can include a universally unique identifier (UUID) identifying a hotel vendor 118, e.g., associating the lock with a vendor's application, user credentials, and a target door identifier. It is also contemplated that the data packet 108 can include a universally unique identifier (UUID) identifying a locking solutions vendor 120 such as a third party that contracts installation, management, and maintenance of the system for a hotel vendor, i.e. a hotel management company. It is also contemplated that data packet 108 can include a unique door identifier 122, a battery status indicator 124, an indicator of open or closed door status 126, a privacy indicator 128 for indicating dead bolt locked or unlocked status, a room occupancy status indicator 130, an indicator of most recent maintenance or maid service status 132, and/or any other suitable indicators. Portions of data packet 108 can be encrypted to provide data security. The ellipses in FIG. 2 indicate other suitable indicators and/or data that can optionally be included in data packet 108. A Bluetooth Smart® Beacon is limited to a total of 37 bytes of payload. This is enough space, for example, to contain the MAC address, one UUID, and a few more bytes containing the door ID, and status. If it is desired to include more types of data than will fit in a single beacon, the content of the advertising data packet 108 can be changed on the fly so that it can be adjusted to contain the type of data that is most important at any particular time for example. For example, FIG. 2 schematically depicts how indicators 116, 118, and 120 can be used in the first block of data packet 108 separately in successive beacon signals, in various combinations with indicators 124, 126, 128, 130, and 132 as needed in the last blocks of data packet 108.

To continue with the example of accessing a hotel room in FIG. 3, a wireless mobile device 134 such as a smart phone can be used to unlock and/or lock the hotel room door 10. To conserve battery power, locking device 100 beacons data packets in a one-way communication and only opens two-way communication when needed, for example to exchange information with mobile device 134. Indication of the intent to unlock can be indicated by rotating motion of the mobile device 134, as indicated by the rotation arrows in FIG. 3, and/or by voice command or any other suitable form of input.

Referring now to FIG. 4, a method of providing access for a user to a structure is shown. As indicated by box 136, the method includes beaconing a data packet 108 providing information to listening devices, e.g., mobile device 134, in a local area without requiring a bi-directional connection to identify a locking device to a wireless device. In an exemplary embodiment, beaconing the data packet 108 includes using a Bluetooth® Smart radio 110, or any other suitable device, to beacon the data packet 108, wherein the wireless device, e.g., mobile device 134, is a Bluetooth® Smart Ready device. Beaconing a data packet 108 to identify the locking device 100 to the wireless device can include identifying the locking device 100 by including a MAC address for the locking device 100 in the data packet 108 and can also include identifying the locking device by including a unique door identifier for the locking device in the data packet 108. The method can optionally include notifying a user of the mobile device 134 as the user approaches a door associated with the locking device identified in the data packet, as indicated in FIG. 4 with box 138. For example, this can include notifying a user of a mobile device if they are moving towards or away from a door associated with the locking device. For example, mobile device 134 can display a varying background color and/or a warmer/cooler indication on the wireless device indicating that the user is moving towards or away from a door associated with the locking device. It is also contemplated that mobile device 134 can provide vibration and/or audible feedback from a mobile device when in proximity to the door associated with the locking device.

Optionally, the method can also include determining distance to the locking device from the wireless device using wireless signal strength, as indicated in FIG. 4 with box 140, and indicating the distance to a user of the wireless device, e.g., mobile device 134. This can be of assistance, for example, to help a user locate their room for a hotel stay. When the guest is in proximity to the room, for example, mobile device 134 can vibrate and/or audibly indicate the location. This can be of benefit, for example, to the visually impaired. Determining distance as indicated with box 140 can further include limiting the distance at which a user can indicate the intent to unlock the locking device using the wireless signal strength.

As part of box 140, the method can include using beacon signal strength and door identifiers received by the wireless device to identify relative location of a user within the structure, displaying a map showing the relative location of the user within the structure on the wireless device, and indicating on the map the relative location of at least one of emergency exits, stair wells, vending machines, elevators, and the like. It is contemplated that in the event of an emergency, the method can include emergency protocols indicated by box 141, which can include highlighting emergency exits on a map and/or activating a flashlight feature of the wireless device upon receiving a beacon which includes an emergency indication.

In another aspect, the method can include opening a connection between the wireless device and the locking device, as indicated with box 142 in FIG. 4. As indicated in FIG. 4 with box 144, with two-way communication open, credentials can be exchanged between locking device 100 and the wireless device to authenticate the user of the wireless device to the locking device 100. Upon failure to authenticate, the locking device 100 will remain in a locked state as indicated with box 146 and this will be indicated in the lock audit trail. The method includes changing the locking device 100 from a locked state to an unlocked state upon successful authentication of the user, as indicated by box 148. It is contemplated that the method can optionally include accepting user input, indicating intent to unlock the locking device, as indicated with box 150 in FIG. 4. For example the input can include a rotating motion of the wireless device, wherein the wireless device is equipped with motion sensors. Any other suitable user input can also be used for this purpose.

Figure 5:
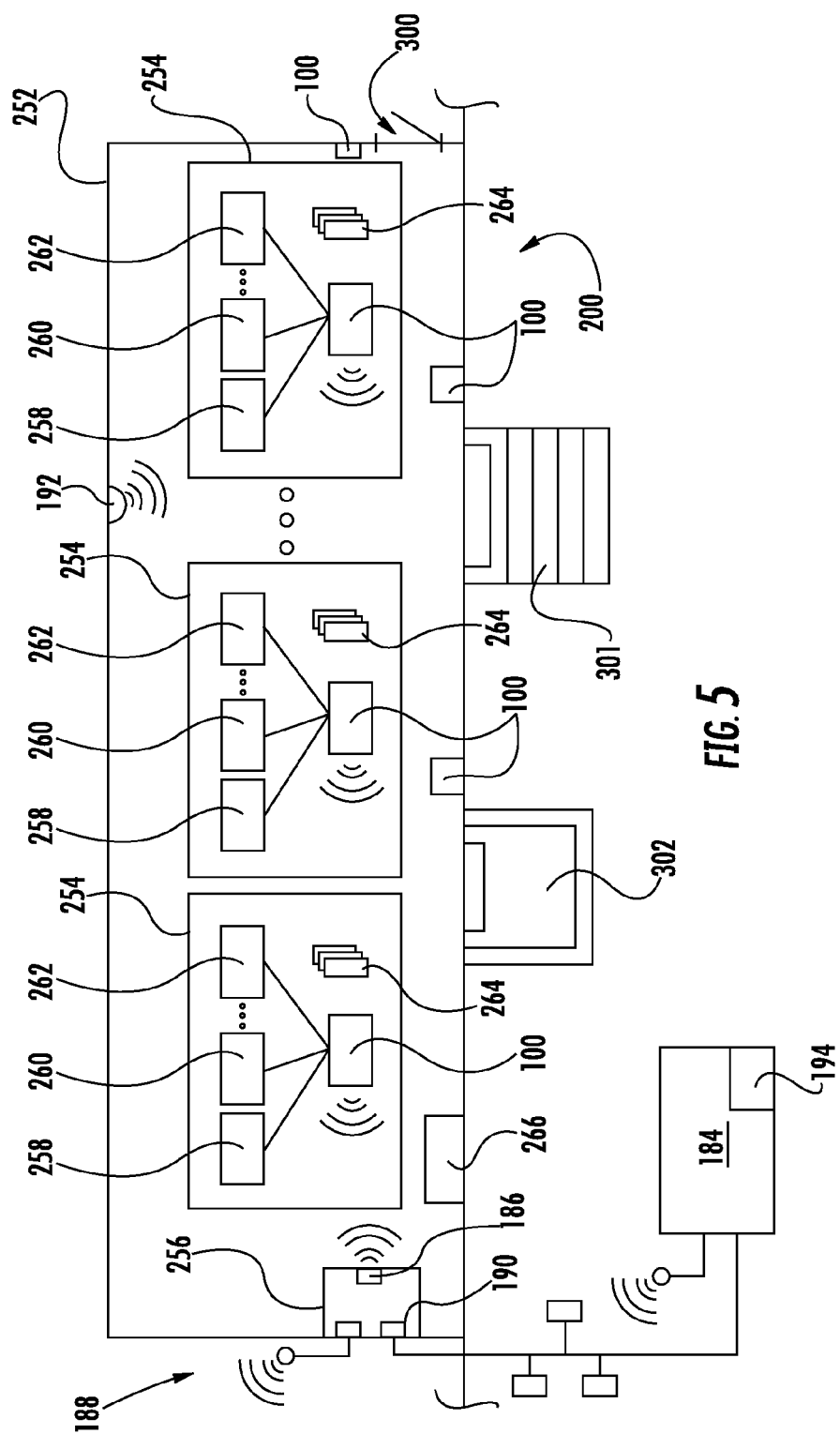
FIG. 5 is a schematic view of an exemplary embodiment of a system in accordance with the present disclosure, showing a plurality of hotel rooms each having a plurality of devices wirelessly connected to a respective locking device.

With reference now to FIG. 5, a system 200 for controlling devices within a structure 252 is described. Structure 252 including devices, and a short range wireless interface device 256 operatively connected to the devices for control thereof. For example, structure 252 can include a plurality of hotel rooms 254 and the wireless interface device 256 can include a Bluetooth® Smart radio. The devices can include a plurality of respective door locking devices 100 as described above, wherein the Bluetooth® Smart radio is configured to listen for beacons from respective door locking devices 100. Structure 252 can include variations of device 100 for use in accessing corridor doors 300, stairwells 301, elevators 302, and the like.

Each hotel room 254 includes an HVAC device 258 configured to be controlled by data received from the beacon the respective locking device 100. It is also contemplated that each hotel room 254 can include a room lighting device 260 configured to be controlled by data received from the beacon of the respective locking device 100. It is also contemplated that HVAC devices 258 and lighting devices 260 are exemplary, and that any other suitable devices can be controlled by data received from the respective beacon in lieu of or in addition to these examples. For instance, a safe 262 in each hotel room 254 can also be controlled by the respective beacon. The ellipses in FIG. 5 indicate that any suitable number of devices and hotel rooms can be included in the system.

Referring now to FIGS. 6 and 7, a method of connecting devices, e.g., locking devices 100, within a structure includes moving a wireless device through a structure, wherein the wireless device listens for beacons from a plurality of locking devices, as indicated with box 170 in FIG. 7. The method also includes providing a temporary access point, indicated with box 172, through the wireless device to connect between individual locking devices 100 and a facility management system 184, which is shown in FIG. 5 and further described below.

For example, the wireless device can be a computer tablet 164, a smart phone 166, shown in FIG. 6, and/or any other suitable device. As indicated with box 174 in FIG. 7, the method can include evaluating the beacons with the wireless device to determine locking device identifications, and/or to determine status changes in the locking devices 100. The method can include connecting the wireless device to the locking devices 100 to upload configuration updates to the locking devices 100, indicated with box 176 in FIG. 7, and/or to download audit histories from the locking devices 100, as indicated with box 178. The wireless device or devices can monitor the beacons to determine battery status of the locking devices 100 as indicated with box 180. This can be done using indicators in the beaconed data packet, by analyzing the signal strength of the beacons, or using any other suitable technique.

Moving the wireless device through the structure can include transporting the wireless device on a hotel service cart 168. For example, as housekeeping moves the cart 168 through the hotel, tablet 164 can connect with various locking devices 100 to exchange information such as for updating locking devices 100, controlling HVAC and lighting devices 258 and 260 (shown in FIG. 5), controlling any other suitable devices such as safe 262, reporting status of locking device 100 or room 254, and/or any other suitable information exchange. It is also contemplated that in addition to or in lieu of using cart 168, hotel staff carry the wireless device through the structure as illustrated in FIG. 6 with smart phone 166 being carried by a hotel staffer to perform the same functions described above with respect to cart 168. This can also allow the wireless devices to locally indicate occupancy status on a room by room basis to the hotel staff, and/or to locally indicate maid service access to the structure, as indicated with box 182 in FIG. 7. It is also contemplated that the method can include displaying the location of the wireless device which as the wireless device is carried on a service cart, by guests, and/or by personnel.

Referring again to FIG. 5, a system in accordance with this disclosure for connecting devices within a structure includes an interface device 256 located stationary with respect to the structure 252. Interface device 256 includes a wireless interface 186 for listening to beacons from locking devices. The interface device includes a communication link for communications between the locking devices and a facility management system 184.

For example, the wireless interface 186 can include a Bluetooth® Smart radio, and the communication link can include a Wi-Fi device 188, and/or an Ethernet device 190. The wireless interface 186 can be configurable to filter for a specific subset of locking device beacon identifications, i.e., so that interface device 256 only handles certain locking devices 100. It is also contemplated that the wireless interface 256 can be configured to evaluate the beacons to determine locking device identifications, and/or to determine a change in status of the locking devices. The wireless interface 256 can be configured to connect and upload configuration updates to the locking devices 100, to connect and download audit histories from the locking devices 100, to connect and upload firmware updates to the locking devices 100, and/or to monitor the beacons to determine battery status in the locking devices 100. The wireless interface 186 can be configured to connect and upload configuration updates to the locking devices 100, to connect and download audit histories from the locking devices 100, and/or to monitor the beacons to determine battery status in the locking devices 100. In short, interface device 256 can provide similar functionality to that described above with respect to the roving access points described above with respect to FIGS. 6 and 7, albeit from a stationary position within structure 252.

Facility management system 184 can operatively connect through interface device 256, and/or a roving access point, to group locking devices 100 to access points and access areas. For example, facility management system can assign hotel rooms 254 proximate to interface device 256 to be handled by interface device 256 directly, and can assign hotel rooms 254 closer to access point 192 to be handled directly by access point 192, which connects directly to facility management system 184 or communicates with facility management system 184 by way of interface device 256. Facility management system 184 includes an optional server 194 operatively connected to manage vendors, doors, and user credentials. The facility management system 184 can be configured to manage local assignment of credentials to locking devices 100, for example to provide access to hotel rooms without the need for a check in at the front desk.

For example, a guest can book a reservation online days in advance, then upon arriving at the hotel, the guest can approach the room using a smart phone to unlock the reserved room using a method as described above, and if necessary, and locks to corridors, staircases, elevators, and the like can be unlocked in a similar manner to provide access to the room. The credentials can be passed as needed from facility management system 184, the smart phone, and the locking device 100 using the systems and methods described herein. Additional forms of media such as magnetic stripe or RFID cards 264 can be made available in the room 254. If desired, the guest can activate the additional media by authenticating the wireless device 134 to the locking device 100 and then activating the additional media by immediately presenting it to the card reader 105 on the locking device.

Additionally included in this disclosure is the availability of one or more Kiosks 266 in the structure 252, at which the guest can create additional magnetic stripe or RFID cards containing the credential from wireless device 134. Reuse of the wireless device credential eliminates the need for a connection between the Kiosk 266 and Facility Management System 184.

In an another aspect of this disclosure, a mesh network can be established between devices. For example, a mesh network includes a plurality of locking devices 100, each including a Bluetooth® Smart radio. The locking devices 100 are configured to be networked together by the Bluetooth® Smart radios reducing the number of wireless access points, e.g., wireless access point 256, required within a system 200. The locking devices 100 can be configured to beacon data packets to listening devices, and to only periodically, to conserve battery power, form a mesh network allowing communication of updates and audits with a facility management system 184. The locking devices 100 can be configured to connect smart phones or the like and to the mesh network using Bluetooth® Smart connections.

While shown and described in the exemplary context of hotel rooms, those skilled in the art will readily appreciate that systems and methods as described herein can readily be applied to any other suitable application without departing from the scope of this disclosure. For example, these systems and methods can be applied in apartment buildings, office complexes, dormitories, office buildings, classrooms, cruise ships, laboratory facilities, or any other suitable types of structures. While controller 111 has been described above with respect to locking device 100, those skilled in the art will readily appreciate that any of the devices described herein can include similar controllers for implementing their respective method steps as described herein.

The methods and systems of the present disclosure, as described above and shown in the drawings, provide for hospitality systems and the like with superior properties including improved connectivity and functionality together with low power consumption. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A locking device for providing access to a structure comprising:
    a locking mechanism configured to selectively switch between a locked state and an unlocked state;
    a wireless interface operatively connected to the locking mechanism to control change between the locked and unlocked states, wherein the wireless interface is configured to periodically beacon a data packet providing information to listening devices in a local area without requiring a bi-directional connection, and wherein the wireless interface is configured to support bi-directional connections as needed to transfer data to the locking device; and
    a battery operatively connected to power the locking mechanism and wireless interface, wherein the wireless interface is configured to vary beacon rate depending on at least one of reservation status, time of day, day of the week, and/or occupancy status, as needed to conserve power in the battery.

2. A locking device for providing access to a structure comprising:
    a locking mechanism configured to selectively switch between a locked state and an unlocked state;
    a wireless interface operatively connected to the locking mechanism to control change between the locked and unlocked states, wherein the wireless interface is configured to periodically beacon a data packet providing information to listening devices in a local area without requiring a bi-directional connection, and wherein the wireless interface is configured to support bi-directional connections as needed to transfer data to the locking device, wherein the data packet includes at least one of a privacy indicator for indicating dead bolt locked or unlocked status, a room occupancy status indicator, and/or an indicator of most recent maintenance or maid service status.

3. A locking device as recited in claim 2, wherein the data packet is at least partially encrypted.

4. A locking device as recited in claim 2, wherein the wireless interface includes a Bluetooth Smart radio configured to beacon the data packet to Bluetooth Smart Ready devices.

5. A locking device as recited in claim 2, further comprising a battery operatively connected to power the locking mechanism and wireless interface, wherein the wireless interface is configured to vary transmit power depending on type of target device and desired communications range to conserve power in the battery and control user proximity.

6. A locking device as recited in claim 2, wherein the data packet includes an indication of lock status including whether the lock has been accessed or tampered.

7. A locking device as recited in claim 2, wherein the data packet includes a universally unique identifier (UUID) identifying a lock vendor.

8. A locking device as recited in claim 2, wherein the data packet includes a universally unique identifier (UUID) identifying a hotel vendor.

9. A locking device as recited in claim 2, wherein the data packet includes a universally unique identifier (UUID) identifying a locking solutions vendor.

10. A locking device as recited in claim 2, wherein the data packet includes a unique door identifier.

11. A locking device as recited in claim 2, wherein the data packet includes a battery status indicator.

12. A locking device as recited in claim 2, wherein the data packet includes an indicator of open or closed door status.

13. A locking device as recited in claim 2, wherein the locking mechanism is configured to lock and unlock a hotel room door.

14. A locking device as recited in claim 2, wherein the locking device is configured to accept at least one additional form of media having user credentials including magnetic stripe cards and/or RFID cards.

15. A method of providing access for a user to a structure comprising:
   beaconing a data packet providing information to listening devices in a local area without requiring a bi-directional connection to identify a locking device to a wireless device for authentication to provide access, wherein the data packet includes at least one of a privacy indicator for indicating dead bolt locked or unlocked status, a room occupancy status indicator, and/or an indicator of most recent maintenance or maid service status.

16. A method as recited in claim 15, wherein the wireless device is a smart phone.

17. A method as recited in claim 16, wherein beaconing a data packet includes using a Bluetooth Smart radio to beacon the data packet, wherein the wireless device is a Bluetooth Smart or Bluetooth Smart Ready device.

* * * * *